(12) United States Patent
Stout et al.

(10) Patent No.: US 9,699,365 B2
(45) Date of Patent: Jul. 4, 2017

(54) COMPACT, RUGGED, INTELLIGENT TRACKING APPARATUS AND METHOD

(71) Applicant: JIGABOT, LLC, Highland, UT (US)

(72) Inventors: Richard F. Stout, Highland, UT (US); Kyle K. Johnson, Eagle Mountain, UT (US); Cameron Engh, South Jordan, UT (US); Kevin J. Shelley, Salt Lake City, UT (US)

(73) Assignee: Jigabot, LLC., Highland, UT (US)

( * ) Notice: Subject to any disclaimer, the term of this patent is extended or adjusted under 35 U.S.C. 154(b) by 301 days.

(21) Appl. No.: 14/045,445

(22) Filed: Oct. 3, 2013

(65) Prior Publication Data

US 2014/0098241 A1     Apr. 10, 2014

Related U.S. Application Data

(60) Provisional application No. 61/744,846, filed on Oct. 4, 2012.

(51) Int. Cl.
*H04N 5/232*     (2006.01)
*H04N 5/222*     (2006.01)

(52) U.S. Cl.
CPC ......... *H04N 5/23203* (2013.01); *H04N 5/222* (2013.01)

(58) Field of Classification Search
CPC ............... H04N 5/222; H04N 5/23203; G06T 2207/30221
See application file for complete search history.

(56) References Cited

U.S. PATENT DOCUMENTS

| 5,008,804 | A | * | 4/1991 | Gordon | ................ F16M 11/18 180/168 |
| 5,179,421 | A | | 1/1993 | Parker et al. | |
| 5,268,734 | A | | 12/1993 | Parker et al. | |
| 5,331,359 | A | | 7/1994 | Leclercq | |
| 5,517,300 | A | | 5/1996 | Parker | |

(Continued)

OTHER PUBLICATIONS

Tarantola, Andrew; 5 Apps to Turn Your Phone into a Universal Remote; Mar. 11, 2013; Gizmodo; http://gizmodo.com/5982909/5-apps-to-turn-your-phone-into-a-universal-remote.*

(Continued)

*Primary Examiner* — Neil Mikeska
*Assistant Examiner* — Marnie Matt
(74) *Attorney, Agent, or Firm* — Workman Nydegger

(57) ABSTRACT

In a video recording environment, a compact, rugged, intelligent tracking apparatus and method enables the automation of labor-intensive operating of cameras, lights, microphones and other devices. Auto-framing of a tracked object within the viewfinder of a supported camera is possible. The device can sense more than one object at once, and includes multiple ways to easy way to switch from one object to another. The methods show how the auto-framing device can be "predictive" of movements, intelligently smooth the tilt and swivel motions so that the end effect is a professional looking picture or video. It is designed to be uniquely small yet rugged and waterproof. And it can accept configuration input from users via a smartphone or extreme-sports camera over wi-fi or bluetooth, including user-programmable scripts that automate the device functionality in easy to use ways.

7 Claims, 10 Drawing Sheets

(56) References Cited

U.S. PATENT DOCUMENTS

| | | | |
|---|---|---|---|
| 5,790,124 A | 8/1998 | Fischer et al. | |
| 5,912,700 A | 6/1999 | Honey | |
| 6,094,221 A * | 7/2000 | Anderson | H04N 5/232 348/231.6 |
| 6,484,148 B1 | 11/2002 | Boyd | |
| 6,608,688 B1 | 8/2003 | Faul et al. | |
| 6,618,010 B2 | 9/2003 | Arndt | |
| 6,769,771 B2 | 8/2004 | Trumbull | |
| 6,801,637 B2 | 10/2004 | Voronka et al. | |
| 7,071,898 B2 | 7/2006 | Hobgood et al. | |
| 7,312,872 B2 | 12/2007 | Ohta | |
| 7,468,778 B2 | 12/2008 | Thomas et al. | |
| D627,744 S | 11/2010 | Yano | |
| D630,168 S | 1/2011 | Yano | |
| 8,031,227 B2 | 10/2011 | Neal et al. | |
| 8,208,067 B1 * | 6/2012 | Singh | G11B 27/005 345/473 |
| D708,796 S | 7/2014 | Sproviero | |
| D723,477 S | 3/2015 | Bruggemann | |
| D732,484 S | 6/2015 | Bruggemann | |
| 2002/0176603 A1 | 11/2002 | Bauer | |
| 2003/0003925 A1 | 1/2003 | Suzuki | |
| 2003/0088179 A1 * | 5/2003 | Seeley | A61B 5/06 600/424 |
| 2003/0095186 A1 * | 5/2003 | Aman | A63B 24/0021 348/162 |
| 2006/0262961 A1 | 11/2006 | Holsing et al. | |
| 2007/0109213 A1 | 5/2007 | Takahashi | |
| 2007/0139163 A1 | 6/2007 | Powell | |
| 2008/0110977 A1 | 5/2008 | Bonalle | |
| 2008/0297304 A1 * | 12/2008 | Moscovitch | H04N 7/181 340/3.1 |
| 2008/0297587 A1 | 12/2008 | Kurtz | |
| 2009/0046152 A1 * | 2/2009 | Aman | A63B 24/0021 348/157 |
| 2009/0048039 A1 * | 2/2009 | Holthouse | A43B 3/0005 473/415 |
| 2009/0096664 A1 * | 4/2009 | Carroll | G01S 7/4026 342/147 |
| 2010/0026809 A1 * | 2/2010 | Curry | H04N 5/222 348/157 |
| 2010/0109847 A1 | 5/2010 | Noel | |
| 2010/0214071 A1 | 8/2010 | Nagai | |
| 2010/0238262 A1 * | 9/2010 | Kurtz | H04N 7/142 348/14.01 |
| 2011/0169959 A1 * | 7/2011 | DeAngelis | A63B 24/0021 348/157 |
| 2011/0214619 A1 | 9/2011 | Risch | |
| 2011/0228098 A1 | 9/2011 | Lamb et al. | |
| 2012/0069178 A1 * | 3/2012 | Nielsen | H04N 7/183 348/135 |
| 2012/0192995 A1 | 8/2012 | Chen | |
| 2012/0232958 A1 | 9/2012 | Silbert | |
| 2012/0287274 A1 * | 11/2012 | Bevirt | H04N 7/185 348/144 |
| 2013/0182225 A1 | 7/2013 | Stout | |
| 2013/0229529 A1 * | 9/2013 | Lablans | H04N 5/23238 348/169 |
| 2013/0271602 A1 * | 10/2013 | Bentley | H04N 7/18 348/143 |
| 2014/0023195 A1 | 1/2014 | Lee | |
| 2014/0074667 A1 | 3/2014 | Smith | |
| 2014/0098241 A1 | 4/2014 | Stout | |
| 2014/0169758 A1 | 6/2014 | Sapoznikow | |
| 2014/0365640 A1 | 12/2014 | Wohl | |
| 2015/0057111 A1 | 2/2015 | Tremblay | |
| 2015/0248917 A1 * | 9/2015 | Chang | H04N 21/8549 386/282 |

OTHER PUBLICATIONS

U.S. Appl. No. 13/744,230, Jan. 26, 2015, Notice of Allowance.

Svoboda et al.; "A Convenient Multi-Camera Self-Calibration for Virtual Environments," Center for Machine Perception; Department of Cybernetics; Czech Technical University in Prague; Aug. 14, 2005.

International Search Report and Written Opinion in corresponding Application No. PCT/US14/11094 dated Jun. 6, 2014.

Mase et al.; Interaction Corpus and Experience Sharing; ATR Media Information Science Laboratories; Nagoya University; Kyoto University; Jan. 2003.

Papanikolopoulos, et al.; Visual Tracking of a Moving Target by a Camera Mounted on a Robot: A Combination of Control and Vision; IEEE Transactions on Robotics and Automation; vol. 9, No. 1; Feb. 1993.

Non-Final Office Action in U.S. Appl. No. 14/507,494 mailed on Feb. 24, 2017.

Non-Final Office Action for U.S. Appl. No. 14/502,156 mailed on Jun. 30, 2016.

Notice of Allowance in U.S. Appl. No. 29/503,885 mailed on Sep. 16, 2015.

Non-Final Office Action in U.S. Appl. No. 14/589,565 mailed on Mar. 23, 2017.

* cited by examiner

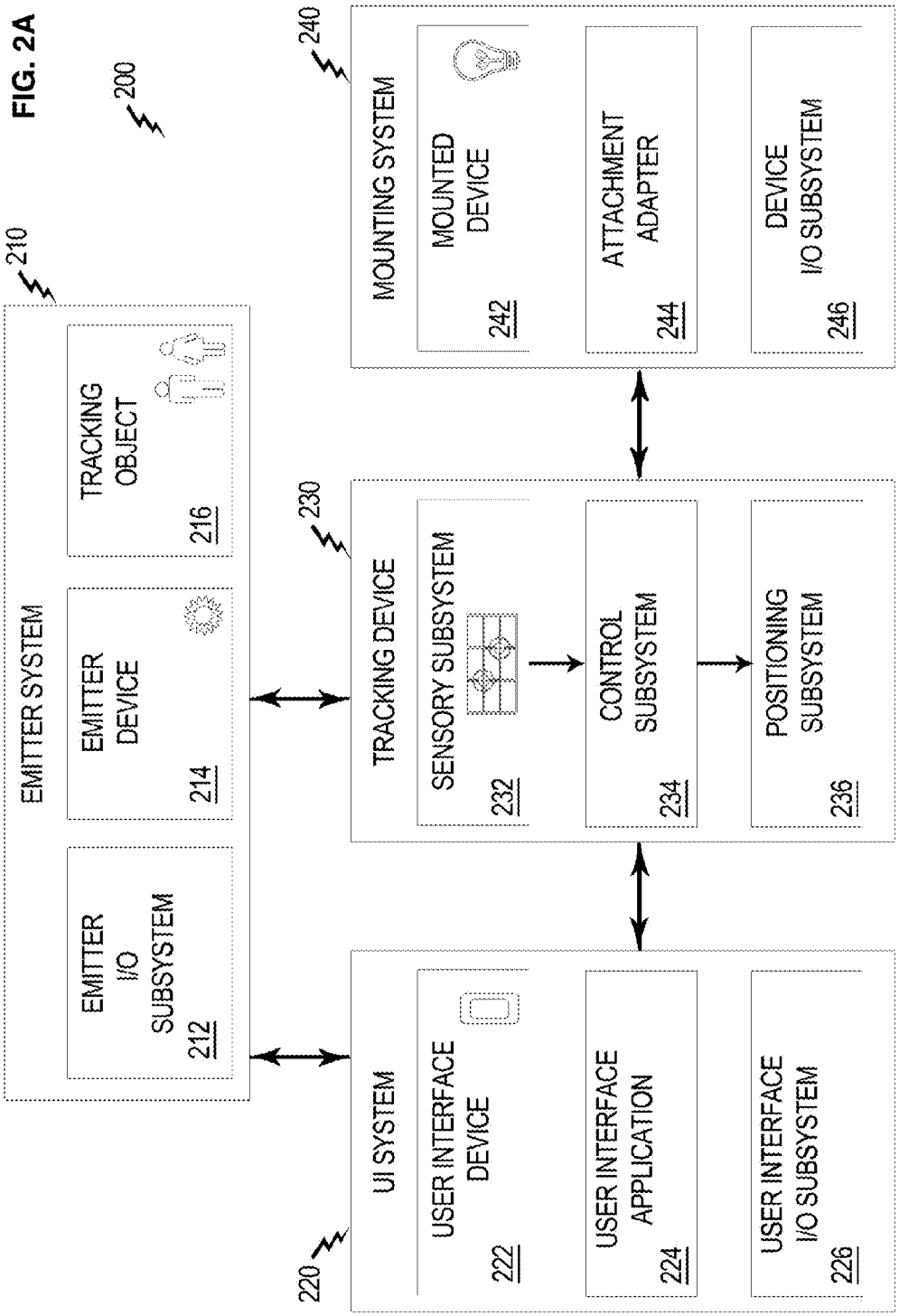

FIG. 4A

MOTION SMOOTHING FUNCTION FOR X-AXIS (SWIVEL AXIS)

$$V_x = \left[ \frac{D_{TTX} - D_{TPX}}{D_{TPX}} \right] V_{TPX}$$

MOTION SMOOTHING FUNCTION FOR Y-AXIS (TILT AXIS)

$$V_Y = \left[ \frac{D_{TTY} - D_{TPY}}{D_{TPY}} \right] V_{TPY}$$

404

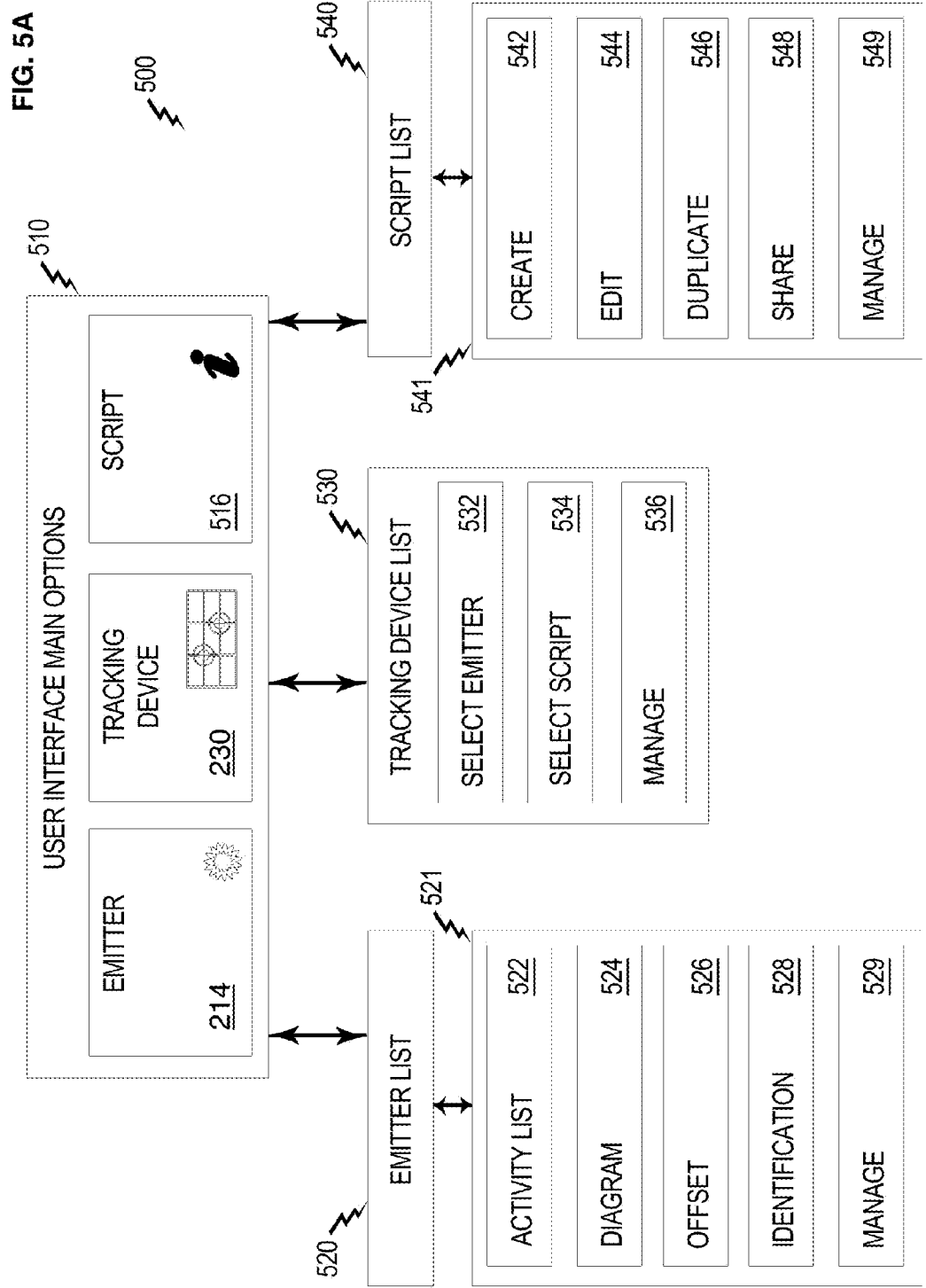

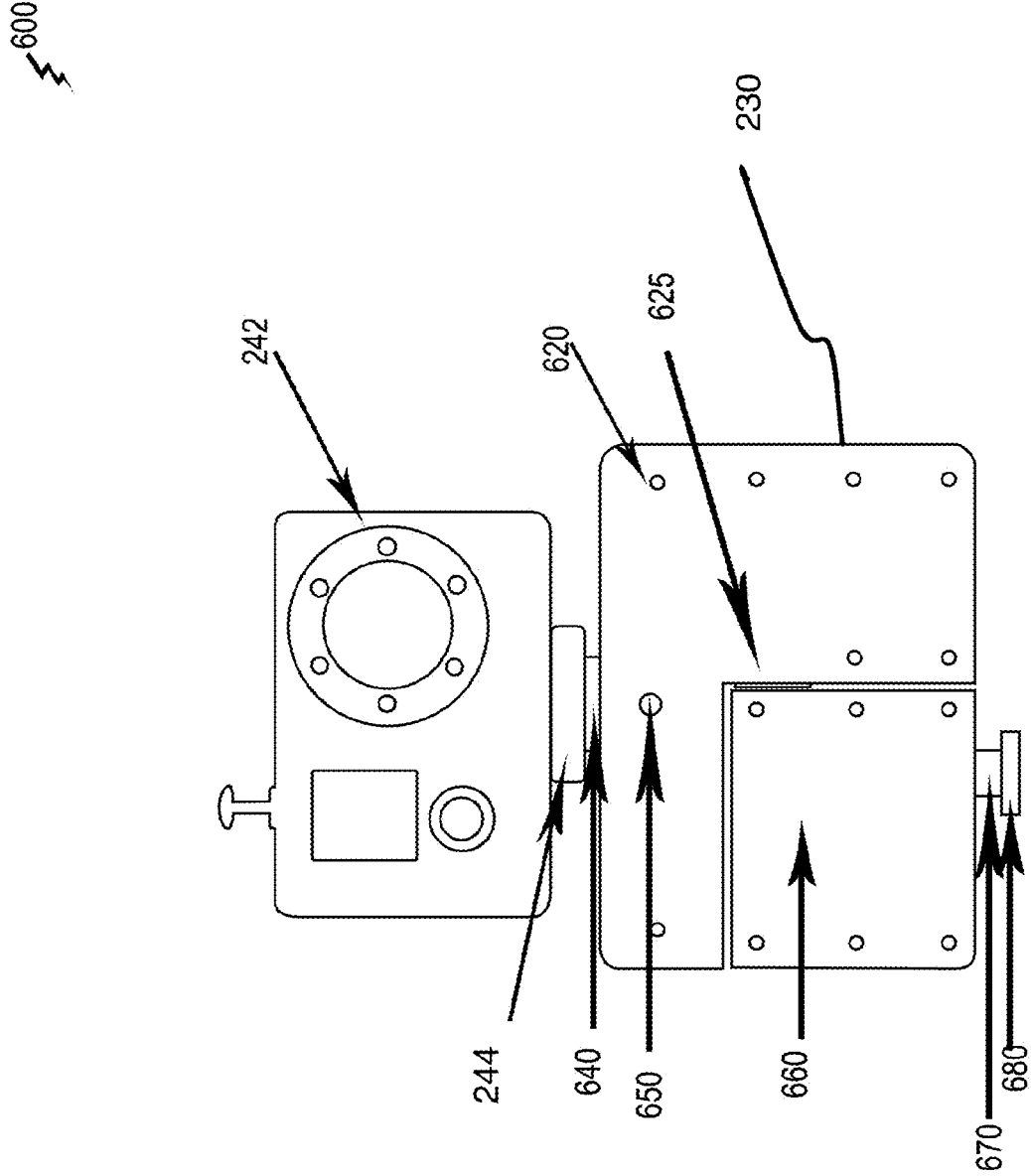

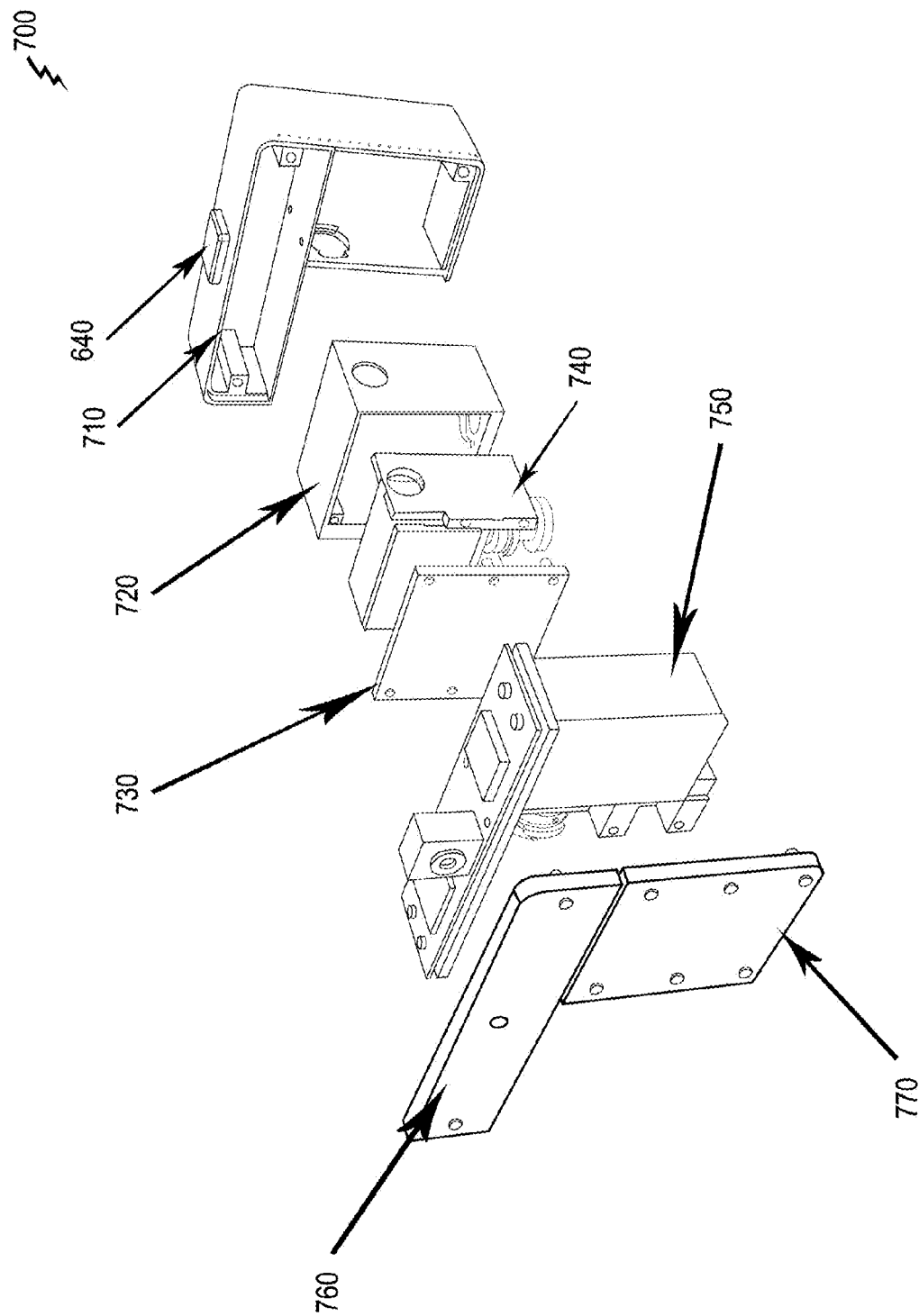

COMPACT, RUGGED, INTELLIGENT TRACKING APPARATUS AND METHOD

RELATED APPLICATIONS

This application: claims the benefit of U.S. Provisional Patent Application Ser. No. 61/744,846, filed Oct. 5, 2012; which is hereby incorporated by reference.

BACKGROUND

1. The Field of the Invention

This invention relates to an automated position tracking system, and more particularly to novel systems and methods for automated position tracking in the fields of consumer or professional film and video production.

2. The Background Art

One reason that video and film production is difficult or expensive, is because it requires skilled labor: people who can operate cameras, lights, microphones, or similar devices with skill. Cameras, lights, microphones, and other equipment will, at various times, be hand held, or otherwise operated by trained individuals (for best effect), while actors, athletes, or other subjects are being filmed, lit, and recorded.

Various devices have been invented which promise to better automate camera operation. Specifically, various object tracking devices have been conceived to track an actor, or other object, and to tilt and swivel a camera automatically to keep the object within the camera's frame or field of view. Such devices might help camera operators (professional or non-professional), or even replace them altogether in certain situations.

Unfortunately, current inventions deal mostly with the means of tracking, and don't come close to defining a device or method or article of manufacture that includes a complete set of attributes fundamental to the interests of cinematographers, TV cameramen, or regular consumers wishing to film themselves or others with quality. Specifically, (1) no system is optimized in mechanical design so as to be compact in volume (so as to be usable in extremely tight locations) as it tilts and swivels—essentially occupying total volumetric space; (2) no system thus optimized in volume is also designed to be powered by or tethered to AC or DC in order to run uninterrupted as long as possible, and yet also be optionally powered by battery packs, in order to provide untethered, flexible, indefinite (if interrupted), operation in the "field" or otherwise; (3) no system thus optimized for volume and power options, is also designed to optionally mount either cameras, lights, or microphones (or other equipment that should be aimed) interchangeably, or easily and securely using quick-release coupling-mount apparatuses and methods.

No current inventions have claims to the above, nor do they claim to be (4) impact resistant, yet contain a gear-and-motor positioning subsystem capable of both fine resolution and quick speed; or (5) water-resistant (or water proof) in order to withstand heavy usage in diverse operating locations: both of which are are essential for professional or amateurs in many "extreme sport" conditions including, but not limited to, climbing, or snowboarding.

Additionally no apparatus, method, or article of manufacture are given for: (6) tracking more than one object at a time—something essential for differentiating objects or switching from one to another, or for (7) providing a method and article of manufacture enabling individuals to configure device settings or program the device easily, and in ways that automate the device via programming "scripts" that can also be shared between users of devices, via wi-fi or bluetooth.

Finally, current inventions do not claim an apparatus, method, or article of manufacture related to a tilt and swivel device that can (8) learn and then predict tracking-object movements, or (9) intelligently smooth the tilt and swivel motors so as to effect a more professional operation.

Whether for professional, or amateur use, clearly there is room for dramatic improvements over the existing art, for a tilt and swivel device in the fields of video and film production, as it relates to the automatic tracking of objects while aiming cameras, lights, microphones or other equipment that needs to be pointed at a moving object (or from a moving position relative to a stationary object).

SUMMARY OF THE INVENTION

In view of the foregoing, and in accordance with the invention as embodied and broadly described herein, a method and apparatus and article of manufacture are disclosed in a preferred embodiment of the present invention as including the following: (1) an emitter system; (2) a user input system; (3) a tracking device; and (4) a mounting system.

The emitter system contains one or more infrared emitters (or other kinds of emitters, including ultrasonic and radio-frequency) that are attached to a person or object to be tracked.

The user interface system includes a smartphone (or other computer device) and associated application for wirelessly configuring a tracking device.

A self-contained, compact, portable, battery powered tracking device (which also can use A/C current via a DC converter), which responds to infrared emitters (or RF or ultrasonic emitters or transponders), and plots their positions within a 2D grid, which can be understood to be like a cartesian coordinate system, in such a manner that an X and Y distance from a center can be determined. The tracking device uses this X and Y data to control a positioning subsystem to tilt and swivel the tracking device so as to center, or otherwise position the emitter system as desired within a 2D grid.

The mounting system, which sits atop the tracking device, is connected and aligned with it, so that the mounted device (camera, light, microphone, etc.) tilts and swivels in synchronization with the movement of this tracking device, essentially "tracking" or otherwise positioning the person or object within the mounted camera's field of view (or the mounted lights' field of luminance throw, or the mounted microphone's field of recording, etc.)

BRIEF DESCRIPTION OF THE DRAWINGS

The foregoing and other objects and features of the present invention will become more fully apparent from the following description and appended claims, taken in conjunction with the accompanying drawings. Understanding that the drawings depict only typical embodiments of the invention and are, therefore, not to be considered limiting of its scope, the invention will be described with additional specificity and detail through use of the accompanying drawings in which:

FIG. 2A is a block diagram of a tracking system in accordance with the invention, including devices, subsystems, and software articles of manufacture effective to implement a system in accordance with the invention;

FIG. 4A shows a formula enabling a means of smoothing and positioning the tracking device on a swivel axis, effective to implement a system in accordance with the invention.

FIG. 4B shows a formula enabling a means of smoothing and positioning the tracking device on a tilt axis, effective to implement a system in accordance with the invention.

FIG. 5A is a block diagram of a user configuration and scripting system in accordance with the invention, including devices, subsystems, and software articles of manufacture effective to implement a system in accordance with the invention.

FIG. 6 is an illustration of a mounted device (a camera), along with its attachment adapter, mounted above a tracking device, effective to implement a system in accordance with the invention.

FIG. 7A is a stylized illustration of some components constituting one embodiment of a tracking device, including those to make it compact, sturdy and water-proof, effective to implement a system in accordance with the invention.

DETAILED DESCRIPTION OF THE PREFERRED EMBODIMENTS AND DRAWINGS

Figure 1:
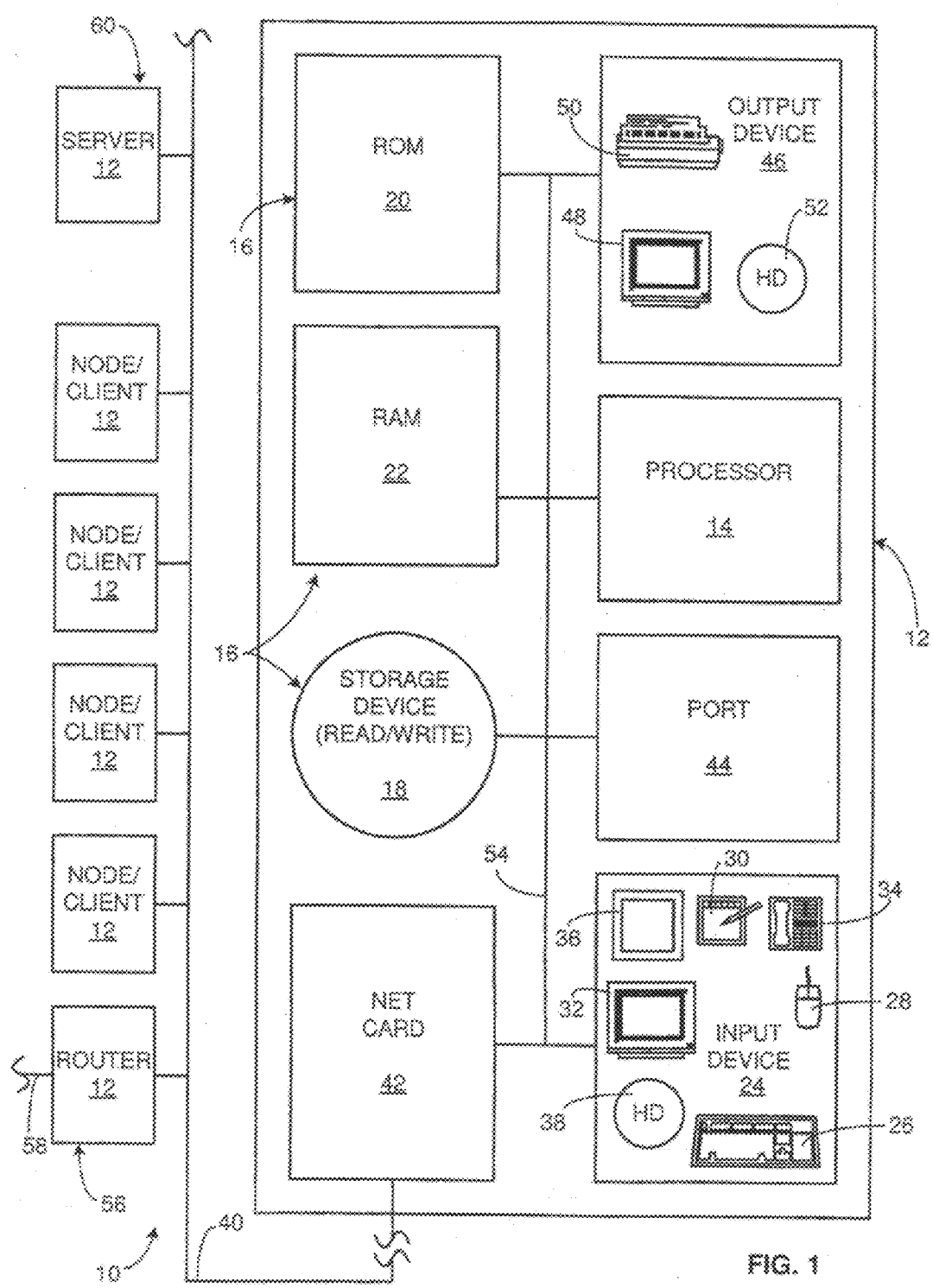
FIG. 1 is a schematic block diagram of a computer system in a network connected to an internetwork, such as the internet for executing software, storing and generating data, and communicating in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention. The illustrated embodiments of the invention will be best understood by reference to the drawings, wherein like parts are designed by like numerals throughout.

The tracking device 230 is sometimes referred to simply as "tracker." An emitter device 214 is sometimes referred to as simply as "emitter." The user interface device 222 is sometimes referred to as simply the "user interface." The sensory subsystem 232 is sometimes referred to as "detector." The control subsystem 234 is sometimes referred to as "controller." And the positioning subsystem 234 is sometimes referred to as "positioner." The device I/O subsystem 246 is sometimes called the "mount I/O system." The mounting system 240 is sometimes called a "mount system." The attachment adapter 244 is sometimes called an "adapter."

FIG. 1 is an illustration of an apparatus 10 or system 10 for implementing the present invention may include one or more nodes 12 (e.g., client 12, computer 12). Such nodes 12 may contain a processor 14 or CPU 14. The CPU 14 may be operably connected to a memory device 16. A memory device 16 may include one or more devices such as a hard drive 18 or other non-volatile storage device 18, a read-only memory 20 (ROM 20), and a random access (and usually volatile) memory 22 (RAM 22 or operational memory 22). Such components 14, 16, 18, 20, 22 may exist in a single node 12 or may exist in multiple nodes 12 remote from one another.

In selected embodiments, the apparatus 10 may include an input device 24 for receiving inputs from a user or from another device. Input devices 24 may include one or more physical embodiments. For example, a keyboard 26 may be used for interaction with the user, as may a mouse 28 or stylus pad 30 or touch-screen pad 30. A touch screen 32, a telephone 34, or simply a telecommunications line 34, may be used for communication with other devices, with a user, or the like. Similarly, a scanner 36 may be used to receive graphical inputs, which may or may not be translated to other formats. A hard drive 38 or other memory device 38 may be used as an input device whether resident within the particular node 12 or some other node 12 connected by a network 40. In selected embodiments, a network card 42 (interface card) or port 44 may be provided within a node 12 to facilitate communication through such a network 40.

In certain embodiments, an output device 46 may be provided within a node 12, or accessible within the apparatus 10. Output devices 46 may include one or more physical hardware units. For example, in general, a port 44 may be used to accept inputs into and send outputs from the node 12. Nevertheless, a monitor 48 may provide outputs to a user for feedback during a process, or for assisting two-way communication between the processor 14 and a user. A printer 50, a hard drive 52, or other device may be used for outputting information as output devices 46.

Internally, a bus 54, or plurality of buses 54, may operably interconnect the processor 14, memory devices 16, input devices 24, and output devices 46, network card 42, and port 44. The bus 54 may be thought of as a data carrier. As such, the bus 54 may be embodied in numerous configurations. Wire, fiber optic line, wireless electromagnetic communications by visible light, infrared, and radio frequencies may likewise be implemented as appropriate for the bus 54 and the network 40.

In general, a network 40 to which a node 12 connects may, in turn, be connected through a router 56 to another network 58. In general, nodes 12 may be on the same network 40, adjoining networks (ie., network 40 and neighboring network 58), or may be separated by multiple routers 56 and multiple networks as individual nodes 2 on an internetwork. The individual nodes 12 may have various communication capabilities. In certain embodiments, a minimum logical capability may be available in any node 12. For example, each node 12 may contain a processor 14 with more or less of the other components described hereinabove.

A network 40 may include one or more servers 60. Servers 60 may be used to manage, store, communicate, transfer, access, update, and the like, any practical number of files, databases, or the like for other nodes 12 on a network 40. Typically, a server 60 may be accessed by all nodes 12 on a network 40. Nevertheless, other special functions, including communications, applications, directory services, and the like, may be implemented by an individual server 60 or multiple servers 60.

In general, a node 12 may need to communicate over a network 40 with a server 60, a router 56, or other nodes 12. Similarly, a node 12 may need to communicate over another neighboring network 58 in an internetwork connection with some remote node 12. Likewise, individual components may need to communicate data with one another. A communication link may exist, in general, between any pair of devices.

FIG. 2A is an illustration of a tracking system or apparatus 200 for implementing the present invention, may include one or more emitter systems 210 (in whole or part), which are followed or tracked by one or more tracking devices 230, upon which may be mounted one or more mounting systems 240 (typically, in a preferred embodiment, a single mounting system 240 would be associated with a single tracking system 230), all of which systems may be configured or automated and otherwise controlled by one or more user interface (UI) systems 220.

In its simplest form, the tracking system 200 is comprised of a single emitter system 210, which would be tracked by a single tracking device 230, upon which is mounted a single mounting system 240, and the tracking device 230 would be configured or otherwise controlled by a UI system 220.

The emitter system 210 may be comprised of an emitter I/O subsystem 212, one or more emitter devices 214, and a person (or persons) or other object (or objects) 216 on which an emitter device 214 is attached or placed.

In a preferred embodiment, the emitter I/O subsystem 212 is connected (at least at times) with the emitter device 214, and may include a computer system 12, or parts thereof (or similar parts thereof including RAM 22, a processor 14 chip, a wireless net card 42, and batteries or other power supplies), in order to enable the emitter device 214 to be configured and otherwise controlled directly or from the UI system 220, and to pulse according to a unique and pre-configured or use-selectable/configurable pulse rate or modulation mode.

Via an emitter I/O subsystem 212, one or more emitter devices 214 may be turned on or off, may begin or stop emitting or signaling, may be modulated or pulsed or otherwise controlled in such a way as to be uniquely distinguishably by the tracking device 230.

The emitter I/O subsystem 212 may also receive signals from or send signals to an emitter device 214, or the UI system 220, or the tracking device 230, and the mounting system 240 directly or via one or more tracking devices 230 or UI systems 220.

The emitter device 214, in a preferred embodiment, is a type of infrared light (such an LED), but may be a supersonic audio emitter, a heat emitter, a radio signal transmitter (including Wi-Fi and bluetooth), or some other similar emitter device or system or subsystem, including a reflective surface from which a color of shape can be discerned by the sensory subsystem 232.

One or more emitter devices 214 modulate, pulse, or otherwise control emitted signals or light (visible or non-visible, such as infrared), or sounds, or thermal radiation, or radio transmissions, or other kinds of waves or packets or bundles or emissions, in order to be discernible to a tracking device 230. The tracking device 230 may communicate with the emitter device 214 via the UI system 220, or the emitter I/O subsystem 212 or both, in order to enhance, clarify or modify such emissions and communications from one or more emitter devices 214.

In a preferred embodiment, the emitter devices 214, are embedded within clothing (such as sport team jerseys, ski jackets, production wardrobe, arm bands, head bands, etc.) equipment (such as football helmets, cleats, hang gliders, surfboards, etc.), props (glasses, pens, phones, etc.), and the like, in order to "hide" the emitter device 214 from being obviously visible to spectators. Micro batteries and other power sources may be used to power the emitter devices 214.

Small emitter devices 214 can be hidden beneath a logo, or integrated with a logo, so as to be prominently visible. Likewise, fashion accessories, such as hats, shirts, shorts, jackets, vests, helmets, watches, glasses, may well be fitted with emitter devices 214, such that the device may be visible and obvious, and acceptably so, for its "status symbol" value.

Tracking objects 216, including people, animals, moving objects such as cars or balls, may all be fitted with emitter devices 214 (whether embedding in clothing being worn, props being carried, equipment being used, or fashion accessories being worn) effectively signaling or emitting their presence, as they move about.

The typical ways in which a tracking object 216 does move about may be known to the UI system 220, via user configuration or input and embedded system algorithms or software. Thus, as the tracking object 216 moves about, the tracking device 230, which communicates with and may be configured, or programmed by the UI system 220, can tilt or swivel, or move in 3D space, in order to follow, and track the tracking object 216, according to a user's preferences or predefined activity configurations or programmed scripts.

And as the tracking device 230 thus tracks the tracking object 216, the mounted system 240 and device 242 (be it a camera, light, or microphone), also follows the tracking object 216 in synchronous motion as well as in ways and patterns "predicted" in part by what that the user configures or programs.

The UI system 220 includes a user interface device 222 (such as a smartphone or other computer 12 device), a user interface application (app) 224, and a user interface I/O subsystem 226 which enables the UI system to communicate to and from the other systems 200 and other devices 210, 220, 230, and 240 within the tracking system 200, and other computers 12.

In one preferred embodiment, the user interface device 222 runs the user interface app 224, and communicates through the user interface I/O subsystem 226 which is typically embedded within, and is a part of, the user interface device 222. The user interface device 222 runs the user interface app 224, allowing users to easily configure one or more emitter devices 214, tracking devices 230, mounted devices 242, and to automate activities within the tracking system 200 via scripts, illustrated later. The user interface application 224 may be programmed to perform other features of sensory input and analysis, beneficial to some other system 200, as well as to receiving user tactile input and communicating with the tracking device 230 or the mounting system 240 of the immediate system 200.

The user interface app 224 may additionally enable other activities as well, but its functionality will include such activities as these: specifying from a list the kind of activity that a tracking object 216 is participating in (jumping on a trampoline, walking in circles, skiing down a mountain, etc.) from a list that may be partially completed, and can be added to and changed by a user.

The user interface app 224 may additionally allow users to diagram the activities expected by the tracking object 216, define an X and Y grid offset for the tracking of the emitter device 214 by the tracking device 230, specify an offset by which the user wants the action to be "led" or "followed," etc. (if tracking other than just by centering of the emitter device 214 by the tracking device 230.) For example, the tracking device 230 may generally follow the emitter device 214 by bias its centering of the tracking object 216 in some manner pleasing to the user. The user interface app 224 may additionally enable interpretation, change, or control of the identification signal (or emitted, modulated signal) or the emitter device 214. It may also manage and enable the user interface device 222, and the user interface I/O subsystem 226, to accomplish tasks and processes and methods identified later as useful for this other somehow interconnected systems 200.

The user interface app 224 may additionally enable updating of one or more computer 12 devices of UI system 222, tracking device 230, mounting system 240, or emitter system 210, or other computers 12 connected to the tracking system 200, and to provide for execution unique and novel formulas or algorithms or scripts or configuration data, enabling improved functioning of the tracking device 230 or other systems within the tracking system 200.

The tracking device 230 may include one or more sensory subsystems 232, control subsystems 234, and positioning subsystems 236. The sensory subsystem 232 may be comprised of one or more sensors or receivers including infrared, RF, ultrasonic, photographic, sonar, thermal, image sensors, gyroscopes, digital compasses, accelerometers, etc.

In a preferred embodiment, the sensory subsystem 232 includes an image sensor that reacts to infrared light that is emitted by one or more emitter devices 214. The sensory subsystem 232 may be designed specifically to identify more than one emitter device 214 simultaneously. The sensory subsystem 232 may be capable of identifying multiple emitter devices 214 that are of the same signal or modulation or pulse rate, or of different signals or modulations or pulse rates.

If multiple emitter devices 214 are of the same signal, modulation, or pulse rate, they may be perceived by the sensory subsystem 232 as a single light source (by means of a weighted average of each, or by some other means), although in fact they may combine to represent a single "point cloud" with multiple, similar signals, modulations, or pulse rates.

If multiple emitter devices 214 are of different signals, modulations, or pulse rates, they may be perceived by the sensory subsystem 232 as distinct from each other: creating in effect multiple light sources within the perception of the sensory subsystem 232. Each light source perceived by the sensory subsystem 232 may be converted to a X and Y position on a two-dimensional grid, as if a cartesian coordinate system, by the sensory subsystem 232 and/or control subsystem 234.

The two dimensional grid may be understood as an image sensor onto which light is focused by lenses, as in a camera system, of which the sensory subsystem 232 may be a kind. The image sensor may be a two-dimensional plane, which is divided by units of measurement X in its horizontal axis, and Y on its vertical axis, thus becoming a kind of measurement grid.

Several times per second (perhaps 24, 30, or 60 or some other common video frame rate), the location of each unique emitter device 214 (based upon a unique signal or modulation, or pulse rate, or perhaps some other identifiable marker), or of each "point cloud" represented by a group of similar emitter devices 214 (based upon a unique signal or modulation, or pulse rate, or perhaps some other identifiable marker), may be given an X and Y coordinate representation, which may be represented as two integer numbers.

In a simple embodiment, the tracking device 230 uses the X and Y coordinate data to calculate (via the control subsystem 234) a distance from a center X and Y position, in order to then position tilt- and swivel-motors via a positioning subsystem 236 to "center" the emitter device 214 within its two-dimensional grid. The net effect is that the tracking device 230 tilts and swivels until "facing" the emitter device 214, or emitter device 214 "point cloud."

In a more sophisticated, novel and unique embodiment, several times per second the tracking device 230, identifies an X and Y coordinate for each emitter device 214, or "point cloud" (cloud) of emitter devices 214. These X and Y coordinates may be saved as a history of coordinates (perhaps appended to a data array unique to each emitter device 214 or emitter device 214 cloud) by the control subsystem 234 which may be a computer 12 or parts thereof including a processor 14 and memory (which might be embedded flash memory, or memory as from a removable SD card, or residing in an internet "cloud.") Over time, these data arrays represent a history of travel of the emitter device 214 or cloud. These data arrays are then analyzed by a control subsystem 234, possibly based upon configuration data that may come from the UI system 220, in order to "fit" their data history into mathematical curves or vectors that approximate the array data history of travel, and also "predict" X and Y coordinates of future travel. In this manner (and in similar ways) the tracking device 230 may thus obtain and analyze data whereby it might "learn" how to better track the tracking object 216 and the emitter device 214 over time or in similar situations in the future.

Thus the control subsystem 234 may control a positioning subsystem 236, and its tilt and swivel motors, in a partly "predictive" manner, that "faces" the tracking device 230 at the emitter device 214 or cloud over time. (This may be particularly useful in cases where the emitter device 214 is partly or fully obscured for at least a period of time.) The net effect of a "learning" and "predictive" tracking capability may yield a more "responsive" and "smooth" tracking activity than would be the case with the simple embodiment or tracking/centering approach alone. The control system 234 may employ other unique and novel mechanisms to smooth the tilt and swivel motors of the positioning subsystem 236 as well, including using unique mathematical formulas and other data gathered via I/O subsystems 246, 226, 212 or those of other tracking systems 200. Triangulation of emitter devices 214, and related tracking device 230 control may thus be enabled.

The positioning subsystem 236 responds to controls from the control subsystem 234 to control servo motors or other motors, in order to drive rotation of the device on a tilt axis, rotation on a swivel axis, and perhaps rotation on a third axis as well.

The mounting system 240 includes a mounted device 242 (such as a light, camera, microphone, etc.), an attachment adapter 244 (which enables different devices to be adapted for mounting quickly and easily), and a device I/O subsystem 246 (which, in a preferred embodiment, enables communication and control of the mounted device 242 via a tracking device 230, UI system 220, or emitter I/O subsystem 212, or some combination of these, including other systems and subsystems of other tracking systems 200.) Data from the mounted device 242 may also be provided to the tracking device 230 or the UI system 220 or the emitter system 210 in order that system 200 performance may be improved thereby in part.

The mounted device 242 may be affixed via the attachment adapter 244 to the tracking device 230, such that the mounted device 242 may be tilted or swiveled in parallel with the tracking device 230, thus always facing the same direction as the tracking device 230. Additionally, the mounted device 242 may be controlled via the device I/O subsystem 246 (and perhaps also via the UI system 220 or the tracking device 230), in order to operate the mounted device 242, simultaneous, perhaps, to the mounted device 242 being positioned by the tracking device 230.

Figure 3A:
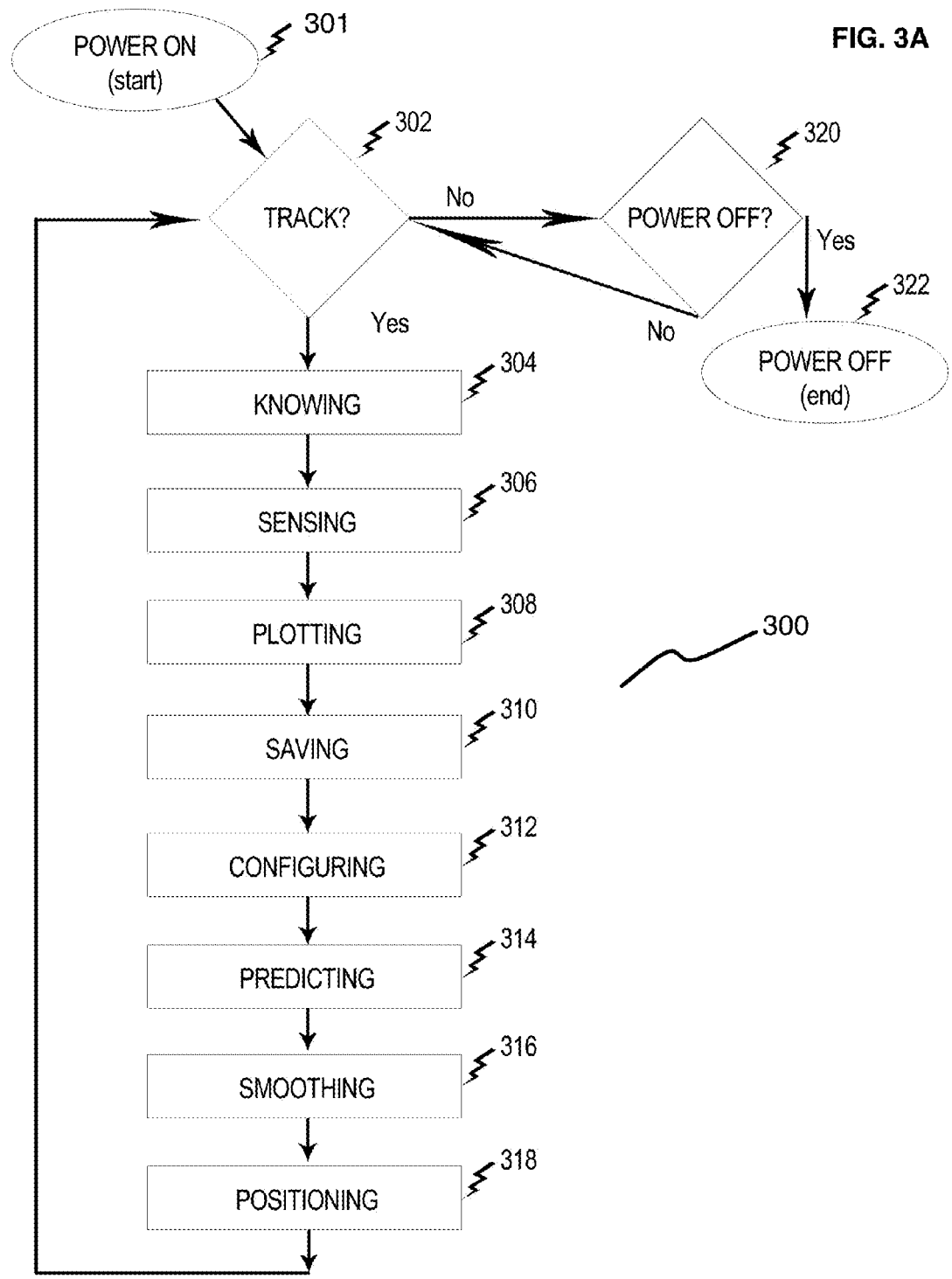
FIG. 3A is a block diagram of a method or process in accordance with the invention, effective to implement a system in accordance with the invention.

FIG. 3A is an illustration of a system, method, or process 300 for implementing the present invention, and more generally for enabling the control system 234 to properly affect the positioning subsystem 236 via data gathered from the sensory subsystem 232, and the UI system 220, and perhaps the mounting system 240 as well as from other tracking systems 200. In a preferred embodiment, process 300 may be contained within software within memory, or in whole or in part within an FPGA device designed for this purpose.

Thus system 300 may be embodied in software or hardware, and may include one or more buttons or switches, and computers 12 (or parts thereof), and logic boards, and software programs. In a preferred embodiment, system 300 resides within the control system 234, but it might reside in whole or in part in the UI device 222, the mounted device 242, or the emitter device 214, or in other devices or system of other somehow interconnected systems 200.

Labeled items 301, 302, 304, etc. may be thought of as tasks that are executed via user input, or by system function, or by partly via programmable scripts, in order to achieve the overall process or logic flow required by the present invention.

Portions of method 300 may be represented by one or more devices. For example, a button or similar switch or device 301 is used to power on the tracking device 230, and enables the process defined in method or system 300. If button 301 has been depressed properly, the tracking device 230 is in a state of "being powered on." After the power is switched on, a user may determine if the process is actually to begin, by (optionally) answering the question of whether or not he/she is ready to track (302). Alternatively, question 302 (as well as other questions of system or method 300) may be answered by the system or by a user configuration setting, or pre-programmed script.

In a preferred embodiment, a button is used to power on 301, and which also commences "automatically configuring" the tracking device 230 to the pulse modulation mode of the present or closest emitter 214. If button 301 is immediately pressed again, it the emitter modulation mode may be incremented to a next appropriate mode, thereby enabling the tracking system 230 to track only emitters 214 configured to this next modulation mode. In any case, after button 301 is pressed, the tracking device may shortly thereafter begin tracking automatically an emitter with the selected or configured modulation mode. There may also be visual LED prompts that aid the user in these activities, as well as to help the user readily identify the state that the tracking device 230 is in relative to process 300.

By answering Yes to the tracking question 302, and if it hasn't already thus changed, the tracking device 230 will be switched into a state of "tracking" and will begin (if it hasn't already done so) the task of learning or knowing 304 what kind of emitter device 214, or emitter device 214 cloud (of similar modulation, pulse rates, or signals) it is to track. Not withstanding the tracking device 230 may sense multiple different emitter devices 214 or clouds at any given time, it is generally going to be configured to follow a single emitter device 214 or cloud at a given time.

The task of knowing 304 is the system task of checking a variable, within a system (perhaps a software or hardware or similar system) embedded in the control system 234 (which may be a computer 10, or parts thereof), which stores the name or identifying ID of the target emitter device 214 or cloud. Thus knowing 304 enables the tracking device 230 to begin searching for or sensing 306, the unique modulation/signaling/pulsing ID associated with the proper emitter device 214 or cloud. This act of "knowing" may be initiated by pressing the button 301 at or near the act of powering on the device 230, as discussed previously, or it may be accomplished by a user pressing this same button 301—or via some other method using the UI system 220, or some other method—during a tracking activity, as might be the case if the user decides to switch the modulation modes and thus to track a different emitter 214.

Task 306, sensing the emitter device 214, shall none-the-less include the sensing of other emitter devices 214 or clouds, and identifying or plotting 308 of the X and Y coordinate position of one or more unique emitter devices 214 or clouds. The task of saving 310 is the storing of each coordinate position, by emitter device 214 or cloud, into a data array variable within the system (perhaps a software or hardware or similar system) that resides within the control system 234. It includes other saving functions, where other system 300 related data is saved, and indeed where other system 200 data needs to be saved. This task is performed, as are all of the other tasks in 300, multiple times per second (although some tasks may be bypassed or become optional by some alternative method 300 or by user configuration or programmed script). Thus each cycle through the process illustrated in 300 results in each task being performed or bypassed, as illustrated in part by the diagram 300.

Thus the tasks of sensing 306, plotting 308, and saving 310, each happen several times per second, and thus record, over time, the position of each emitter device 214, and the position changes over time. Although configuring can happen via the UI system 220, and otherwise, and its data be used in method 300 prior to 312, configuring 312 is the task of retrieving and analyzing data variables from memory by a processor 14 (or via a hardware only process, as by FPGA) residing within the control system 234, which may have originated from the UI system 220. This configuration data that is checked in the configuring task 312, may include mathematical curves, or vectors, programmed scripts for automating system 200 activities, as well as other configuration data specific to the emitter device 214 or cloud, or other components of the tracking system 200.

In a preferred embodiment, the configuration data may be a mathematical curve or vector associated with the kind of tracking object 216 activity anticipated by the user, and configured via an UI system 220, thus enabling the predicting task 314 of the process, particularly if the emitter device 214 is not visible wholly or for a period of time. A user may interact with a UI system 220, independently from the configuration task 312. Once the UI system 220 data is transferred (perhaps via the user interface I/O subsystem 226) to the control subsystem 234, the data may become accessible to the algorithms and methods associated with the configuration task 312, and to future cycles through the process 300. In this manner, and perhaps others, method steps 304, 306, 308, and 310 may all have access to configuration 312 data even though configuring 312 follows these other steps in method 300.

The predicting task 314 includes application of novel and unique algorithms, which may serve purposes of fitting or averaging the plotting data from task 308, with curves identified by users and configured in task 312. This process or similar processes of "averaging" of data types, can also serve to smooth 316 the data passed to the positioning system 318, in such a way that the effect is a more "professional" or less choppy motion (as "seen" or recorded by the mounted video device 242 or another device 242).

Additionally the predicting task 314 may assist in analyzing some or all of the history of past emitter 214 location X, Y data, "learning" from that analysis, and making and storing assumptions as a results, which help to yield positioning data (similar to data of the type found in task 308) related to where the emitter tracking object 216 will likely move next.

Such predictions may also include ranges of data, intermediate sums or products, and statistical standard deviations, and so on. Such predictions of tracking object 216 movements, will be used to aid the responsiveness of the system to such movements, and will include additional, novel and unique methods to insure that predictions are combined with (and rank-ordered as subordinate to or superior to) simple plotting task 308 data, in order to insure both responsiveness and accuracy. The smoothing function 316 assists "responsiveness" by enabling corrections or overcorrections to be integrated back into the positioning 318 function minimizing unacceptable results for users.

Additionally, predicting task 314 processes may derive from or be combined with both configuration data in the form of proprietary algorithms, based on mathematical smoothing functions, in order to affect the commands of the control system 234, and also user-programmable scripts that affect predicting 314, smoothing 316, positioning 318, and other methods of 300 and of the tracking system 200.

The net result of system 300 functioning, is that the tracking device 230 moves in a manner that the mounted device 242 (such as a camera), may record footage that is more aesthetically pleasing, and otherwise more typical of footage shot by a seasoned professional cinematographer or camera operator, rather than footage shot by a machine.

After the smoothing task 316 is completed, the positioning task 318 can be executed, which may include all of the processes executed by the positioning subsystem 236. Thus the motor system is controlled on both a tilt and swivel basis, in order to track a tracking object 216, or otherwise behave in a manner that may be stipulated by the user-programmable script.

Once a positioning task 318 is completed, the process returns to the question of whether or not to continue tracking 302, which is presumed to be Yes, after the initial loop thru process 300, unless, and until, the user presses a button (shared with task 301) or otherwise indicates to the tracking device 230 via UI system 220 or user-definable script, that a pause in the process is desired (which results in the tracking question 302 being answered with No).

If the tracking question is Yes, the tasks of 304 through 318 are executed again, and return to task 302, over and again (in an operating state or a tracking state) until interrupted by a No response to the tracking question 302. If the tracking question 302 is No, a second question 320 is asked, should the system power off? If the answer to that question 320 is also No, then the tracking device 230 is in "paused state" of readiness, unless and until the tracking question 302 is answered by Yes (via a button push or other method), or the power off question 320 is answered by Yes and the power off 322 task is executed. The "pause state" may also, in a preferred embodiment, be the result of holding down the same button 301 for a longer duration than would be the case of powering on or incrementing thru emitter modulation modes. The "power off" 320 question may similarly be answered by the same button 301 being depressed for a longer duration still.

If the power off 322 task is executed then the tracking device 230 is in a state of "being powered off."

FIG. 4A is an illustration of a sample mathematical function 402 which may be employed by the control system 234 for rotating the swivel axis of the tracking device 230, by the positioning subsystem 236. It enables the velocity relative to the X axis to be a function of the distance that the motors must travel in order to reposition the tracking device 230 to track the tracking object 216.

Vx represents the velocity in the X-axis direction (positive or negative). DTTX represents the total distance to travel along the X-axis. DTPX represents the total distance possible that could be traveled along the X-axis. The difference between DTPX and DTTX, divided by the DTPX represents a fraction of the total distance that must be traveled along the X axis, at any given point in time. And VTPX represents the total velocity along the X axis that is possible by a given motor.

Thus the velocity of x-axis movement is a function of the distance that must be traveled: if that distance is great, the speed is great, if the distance is small, the speed is small. The unique effect of function 402 on the motor speed, is to slow or sooth the motion of the positioning subsystem 236 as it transitions into and out of a stationary state (distance equal to 0) along the X axis.

Other variables and mathematical functions may be combined with this function 402 in order to provide greater programatic manipulation, or configuration via users, or integration with steps shown in process 300, or with user-programmable scripts.

FIG. 4B is an illustration of a mathematical function which may be employed by the control system 234 for rotating the tilt axis of the tracking device 230, by the positioning subsystem 236. It enables the velocity relative to the Y axis to be a function of the distance that the motors must travel in order to reposition the tracking device 230 to track the tracking object 216.

The function can be employed with only slight modification to provide the same benefits along the y-axis, as function 402 provided for the x-axis calculations. Therefore, Vy represents the velocity in the Y-axis direction (positive or negative). DTTY represents the total distance to travel along the Y-axis. DTPY represents the total distance possible that could be traveled along the Y-axis. The difference between DTTY and DTPY, divided by the DTPY represents a fraction of the total distance that must be traveled along the Y axis, at any given point in time. And VTPY represents the total velocity along the Y axis that is possible by a given motor.

The unique effect of function 404 on the motor speed, is to slow or smooth the motion of the positioning subsystem 236 as it transitions into and out of a stationary state (distance equal to 0) along the Y axis.

Mathematical functions shown in both 402 and 404, as well as other functions, may be employed by the control system 234 and positioning subsystem 236 to smooth the motion of the tracking device 230, as if follows the tracking object 216, in order to produce a smooth, pleasing effect by means of the mounted device 242.

Other variables and mathematical functions may be combined with this function 402 in order to provide greater programatic manipulation, or configuration via users, or integration with steps shown in process 300, or with user-programmable scripts.

FIG. 5A is a block diagram of a system 500 for implementing the present invention, and more generally for implementing the software application (app) 224, which may be used by the user interface device 222 to configure and control the tracking device 230, emitter system 210, and mounted device 242 via the user interface I/O subsystem 226. System 500 may also be used to integrate multiple tracking devices 230, or clouds of tracking devices, or additional tracking systems 200.

Each object in the diagram 500 may be thought of as tasks, apps, app UI screens, functions or methods, subsystems, etc. In a common model-view-controller programming model, system 500 may be considered to include each of these component pieces, although other subcomponents of system 200 may assist with one or more of them. System 500 may also be embodied within a device, such as a computer system 10, or some subset thereof, even though it might be embodied primarily in memory of such a device, or in an FPGA.

This system 500 includes three general options, emitter 214, tracking device 230, and script 516. By selecting one of these three general options, related sub-options can be selected. If emitter 214 option is selected, an emitter list 520 may appear to view. This may include a list of all emitter devices or clouds 214 of interest.

By selecting an emitter device or cloud 214 from the emitter list 520, at least five new options 521 become available: activity list 522, diagram 524, offset 526, identification 528, and manage 529. By selecting the activity list 522 after selecting an emitter device 214 or cloud from the emitter list 520, a user may be able to specify, from an existing list, an activity representative of the type that the tracking object 216 and its associated emitter device 214 or cloud may be doing (such as jumping on a trampoline, or riding a bike down a street). The activity list function 522 may also enable a user to add, edit or delete activities from the activity list 522.

The diagram function 524, may enable users to graphically plot, in two or three dimensions, the general motion path of a tracking object 216 within an existing or new activity (as listed in the activity list 522). The diagram function 524 may also enable a user to specify expected distances and velocities of the tracking object 216, as well as curves and vectors that may be more detailed than the general motion path anticipated by the tracking object 216, as well as other configuration data. The purpose of these inputs include the novel and unique functionality of being able to more accurately predict tracking object 216 motion, and more accurately respond via the control subsystem 234 and the positioning subsystem 236, by partly by providing data to be used by the predicting task 314.

The offset 526 function may enable users to define X- and Y-coordinate units of offset from center, that the user wishes the tracking device 230 to bias its tracking activity. Such bias may provide novel and unique benefits to users by allowing them to frame the tracking object 216 in ways that are not simply centering in nature. The offset task 526 may also enable a user to specify other useful biasing configurations. The identification task 528 may enable users to specify, by emitter device 214 a unique modulation, pulse, or signal that the user wishes to be emitted by the emitter device 214, or which he/she wishes that the sensory subsystem 232 can identify and sense and track, or other activities.

The manage task 529 may enable users to import, export, share, edit, delete, duplicate, etc. configurations items 521, or subordinate tasks associated with 522, 524, 526, and 528, and system 500 specifically, or tracking system 200 generally, as well as with other tracking systems 200. A preferred embodiment enables the unique and novel feature of sharing these configuration settings 521, with others who may be using a tracking device 230, or emitter 214, or mounted device 242, or this or another tracking system 200. It may be possible that options 521 specified for an emitter device 214 or cloud from a list of emitters 520, may also be applied easily to other emitter list 520 devices 214 or clouds.

While user interface options 510 is comprised of emitter 214 data, tracking device 230 data, and script 516 data, these data are representations of the actual emitters 214, tracking devices 230, and scripts 516—and in a preferred embodiment may be icons or user interface buttons or tabs or similar UI control. In one embodiment, when a user first sees the user interface main options 510 screen, there may be three options (214, 230, 516) as tabs (or a similar UI controls) for selecting one of these three options, but the tracking device list 530 may already be selected by default. If the tracking device option 530 is defaulted or selected by default, or if it selected, a list of one or more tracking devices 230 may be displayed. Similarly when emitter list 520 is selected (by default or otherwise), the user interface main options screen 510 may show the emitter list 520, although the other main options emitter 214, tracking device 230, and script 516 may all be accessible with a single click of a button or icon.

When the tracking device 230 option is selected from the main options 510, a list of tracking devices 530 may open (and may default to the currently selected device 530), allowing an easy association of associated emitters 532, and scripts 534. A user may select another tracking devices via the tracking list 530 or via the manage 536 option, or in some other useful way. Various options may be user configurable. Other tracking devices 230 and emitters 214 and scripts 516 from other tracking systems 200 may be selectable from this portion 530 of the system 500.

The select emitter 532 function enables the user to specify which emitter device 214 to associate with the currently-selected tracking device, and hence to track via method 300 or a similar method. The select emitter 532 function may include a list of emitter devices 214 from which to select one. These emitters may come from the tracking system 200 or another tracking system 200 or systems 200. Uniquely, the software app system 500 in this way provides a novel method by which a user can easily reconfigure 312 a tracking device 230, while it is in a "tracking state," identified by steps in process 300 individually or collectively, to change its focus to a different emitter device 214, or person or tracking object 216. The select emitter 532 option may optionally enable users to select a tracking object 216, as it may be desirable to track a person or tracking object 216 based upon colors or shapes associated with the tracking object 216, with or without an associated emitter 214 attached.

Regardless, the select emitter 532 function may be useful during an event shoot, for example, when switching between members of a band (each band member with an attached tracking device 230 using unique pulsing modulation modes) as they are performing and being filmed, or for switching between members of an athletic team (each as a unique tracking device 230) as they are competing in a sport and being filmed. By configuring the tracking device via 532, to follow a unique modulation, or signal, or pulse (representing one being used by an emitter 214) the associated tracking object 216 can be uniquely identifiable by the sensory subsystem 232, and tracked via the positioning subsystem 236.

When the select script 534 option is selected, the user may be able to select a user-programmable script 516 from a previously-created list 540. Such scripts may enable a user to configure the behavior of a tracking device 230, from the tracking device list 530, to behave in a pre-defined way.

For example, when a script is selected 534, the device may be automated in the following kinds a ways: (1) the device does not enter a "tracking state" until a predetermined amount of time has lapsed, or until am emitter 214 with a particular modulation pulse is "seen" by the sensory subsystem 232; (2) the devices tilts or swivels to an initial direction in which the tracking device 230 should be pointed; (3) the tracking device 230 moves to an ending tilt-and-swivel direction after tracking the emitter 232 for a period of time; (4) the tracking device 230 transitions from one emitter device 214 to another, if the sensory subsystem 232 were to see a second emitter device 214 of yet another unique modulation mode; (5) if the tracking device 230 "loses sight of" the emitter device 214 it may continue on a path informed by a particular configuration curve or activity curve (say, similar to the motion of a tracking object 216 if on a trampoline); (6) movement (tilt, swivel, otherwise) into or out of a shot, according to user-defined parameters, such as panning or tilting that is NOT following an emitter temporarily; (7) etc. These automation scripts are generally intended to automate a variety of activities based on certain conditions being met, as explained more later.

The manage feature 536 of app system 500 may enable the adding, deleting, importing, exporting, duplicating, etc. of items and features components of the tracking device list 530 portion of the software app system 500, including from other tracking systems 200. As with emitters and list 520, or scripts and list 540, it may be possible that options found in 530 may be easily applied to more than one tracking device 230 at a time.

The script list option 516, if selected, may open a script list 540. Scripts, selected from a script list 540, can then be created 542, edited 544, duplicated 546, shared 548 (imported and exported), and otherwise managed 549. These scripts may be created 542, customized 544, and selected 534 for implementation, and may result in virtually limitless customized activities that can be automated or partly automated relative to the tracking device 230 or emitter 214.

The create 542 feature may be used to create the script using screens and features designed for that purpose. The edit 544 feature may be used to edit a script using screens and features designed for that purpose. The duplicate 546 feature may be used to duplicate a script using screens and features designed for that purpose, and then further edited 544 so as to quickly create a variation from an already existing script. The share 548 feature may be used to import or export scripts using screens and features designed for that purpose, and shared within this system 200 or another system 200 with other users. Scripts thus shared may be moved in one way or other, via computer systems 10, user interface I/O subsystems 226, or via other means.

A preferred embodiment of the system may include a computer system 10 which includes a website server where scripts can be exchanged (with or without money) between other tracking device 230 users. Companies, including a tracking device 230 manufacturer, may create one or more scripts customized to specific activities (ice skating, jumping on a trampoline, etc.) in order to provide users with enhanced options. These scripts are integrated into the tracking process via step 312 of method 300, and perhaps elsewhere.

Thus benefits like the following may accrue to a users of multiple tracking devices 230: standardizing the "looks" of "shots." Tracking device 230 users may be able to develop areas of script automation expertise, and sell their specialized scripts to others for mutual advantage. As with manage features 529 and 536 for emitters and tracking devices, management 549 of the script list may enable expanded functionality via users, tracking device 230 manufacturers, or third parties who develop software "add-ins" to the system 500, to include activities useful to users, that are not already covered in the other options within the script list 540 software app system 500.

FIG. 6 is a stylized illustration of a tracking system device diagram 600 for implementing one embodiment of the present invention, and includes a mounted device 242; a tracking device 230 (including elements 620, 625, 640, 650, 660, 670, and 680), an attachment adapter 244 associated with the mounting system 240, and 640 which is associated with the tracking system 230 and which combines with 244 to enable "quick coupling" of the mounted device and the tracking device.

While system 600 shows a mounted camera as the mounted device 242, it might also show a mounted light, or microphone, or some other mounted device 242. The mounted adapter 244 is specific to the mounted camera device 242, and thus may be different for a camera, a light, or a microphone—although any adapter device 244 may work with 640 to enable quick coupling and quick decoupling. The other half of the mounted adapter, 640, is a "universal adapter" that is "permanently" attached to the tracking device 230.

Element 620, is joined to the left side 660 via a bearing-and-axil subsystem 625. Element 620 represents the right half of the tracking device 230 and houses the sensory subsystem 232, the control subsystem 234, and half of the positioning subsystem 236. Specifically, element 620, contains the motor assembly (or servo assembly) and bearing-and-axil subsystem 625 required to tilt the device about the Y-axis or vertical-axis. Thus 620 can tilt, and when it does, the sensory subsystem 232, control subsystem 234, part of the positioning subsystem 236, as well as mounted adapters 244 and 640, and the mounted device 242 will also tilt in synchronous motion.

A covered hole 650, is found in 620, and provides a window through which the sensory subsystem 232 can "see" or sense the emitter device 214 or cloud that it is supposed to track. The element 660 contains the battery, motor assembly, and axel assembly (670) required to swivel the device about the X-axis or horizontal-axis, and comprises the other half of the positioning subsystem shown as 236. Thus 660 can swivel, and when it does, the associated other half, 620, also swivels, and the mounted adapters 244 and 640, and the mounted device 242 will also swivel in lock-step. The element 680 is a universal adapter (and like all elements of 600, may also have parts not shown), enabling the mounting of the tracking device 230, and more specifically the swivel axel assembly 670 to be mounted to "any" tripod or other suspending device or grip device or mechanism. These "universal adapters" provide further unique and novel benefits to users of the present invention; specifically, allowing users to quickly mount and dismount the tracking device 230 from other devices.

The camera, as shown as the mounted device 242, may measure 2 inches by 3 inches by 2 inches in size. Similarly, the tracking device 230, as illustrated in 600, may measure 3 inches by 3.5 inches by 1.5 inches in size. Thus, system 600 in this embodiment possesses the novel and unique benefits of being compact, battery powered, and portable. As will be shown later, the tracking device 230 is also designed to be easily assembled (and hence less expensive), and to be uniquely rugged.

FIG. 7A is an illustration of a stylized tracking system assembly diagram 700 for implementing an embodiment of the present invention, and may include a universal adapter 640; an enclosure 710 (corresponding with 620), and into which subassembly 750 is inserted, and into which doors 760 and 770 are fastened; and enclosure 720, into which subassembly 740 is inserted, and door 730 is fastened.

In one embodiment, element 710 is perhaps milled of a solid aluminum block, so that it is uniquely strong, and so that it fits with the subassemblies precisely, without wiggling when the tracking device 230, and the enclosure 710 moves. The enclosure 710 is also notched in order to be fitted with doors 760 and 770 in ways that may be uniquely dust-proof, pressure-resistant, and water-resistant or water-proof, once a rubber o-ring (not shown) is fitted into 710 where the doors are then fitted.

The subassembly 750, in one embodiment, may also include a solid all-aluminum mount system (or similar system), onto which the servo motors, batteries, circuit board, and axel systems may be partially sub-assembled. The size of the subassembly is engineered to precisely fit within the enclosure 710, with the doors 760, 770 attached. These novel features uniquely enable easy assembly, which may translate into lower costs of assembly labor costs, lower product price, and higher quality of the assembled product.

Other components of subassembly 750 will be detailed later. Subassembly 740 includes a servo mother (or other motor), a battery, and an axel assembly. It fits precisely within enclosure 720 (associated with 660), and thus provides similarly unique benefits provided by subassembly 750. Other components of subassembly 740 will be detailed later. Some screws or similar devices, are shown attached to doors 730, 760 and 770. And while many of these attachment screws or devices are functional, some may be simply aesthetic, in order to provide a design that is appealing to customers.

Enclosures like 710 and 720 serve, among other functions, to seal the tracking device 230, from outside elements like dust and water, and they may be filled with special "marine gels" that are non-electrically conductive, but that none-the-less provide pressure against water seeping into the enclosure. Thus providing for further protection against waterproofing and dust-proofing and generally guarding against the entry of elements from outside of the enclosure.

The shape, of enclosures 710 and 720, as well as the sub-assemblies and doors of system 700, are designed to be aesthetically attractive, while also being efficient shapes for CNC milling processes, thus again strengthening the novel and unique aspect of strength that derives from parts that may be milled from solid aluminum (or similarly produced in a manner that preserves unique strength). When sensory subsystem 232 requires RF transmission or receiving, or other sensory activity, these devices shown in 600 and 700 and elsewhere may be CNC'd or otherwise produced in order to be more amenable to the tracking signals or emissions sensed by the sensory subsystem 232 and emitted by emitter device 214.

Subassembly 750 shows assemblies and subassemblies that combine to enable easy assembly and rugged construction. This method of design and assembly also enables the additional use of ball bearings, "o-rings," and "boots" and "gels" to protect the device from elements, including dust and water. System 750 includes illustrated axels and ball bearings although not prominently shown until later; these ball bearing devices may also be dust and water proof, and thus combine, with other precautions not detailed here, to enable the securing of the overall tracking device 230 from water or dust at its most vulnerable (rotation) points.

Figure 7B:
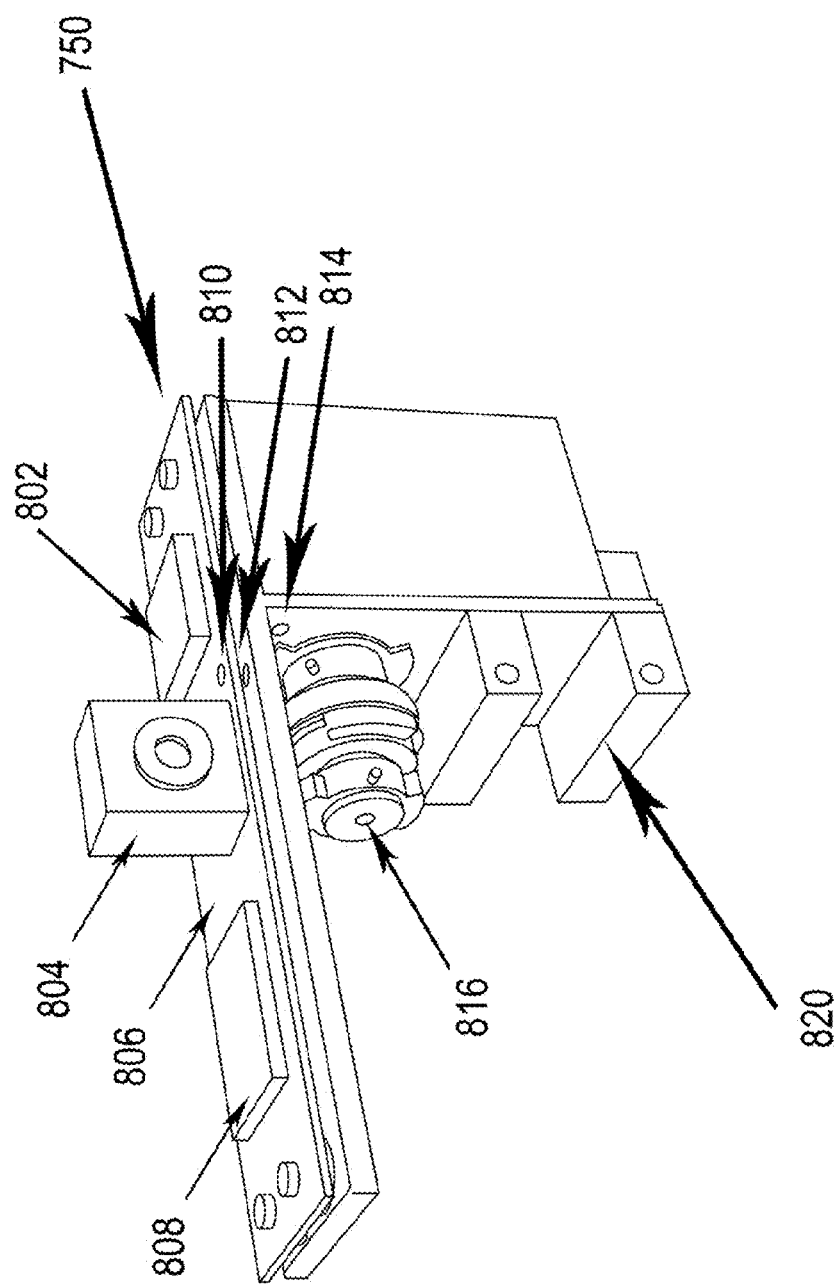
FIG. 7B is another stylized illustration of a subset of components from a one embodiment of a tracking device, including those to make it compact, sturdy and water-proof, effective to implement a system in accordance with the invention.

FIG. 7B further serves to illustrate how an embodiment of the present invention, is designed to provide novel and unique benefits of low labor assembly costs, and rugged strength. Subassembly 750 may be used for implementing an embodiment of the present invention, as well as an illustration all non-aluminum-mounting components (or all non-aluminum-alternative mounting components) that may be included within enclosures 710 and 720.

The subassembly 750 in FIG. 7B may include a circuit board 806, shown with some of its components and features; an axel assembly 816 shown along with some of its features; and an "aluminum"-mounting component 820 to which the assemblies or components are mounted. Note that a battery and covered servo mother are also illustrated in 750, but are not numbered for discussion until later.

Circuit board 806 may include some or all elements of computer 12, and in a preferred embodiment may include a processor chip 14, shown here as 802, and include the control subsystem 232 with associated memory and software, etc.; a sensory subsystem 232, shown here as 804, and may include other devices for sensing some non-IR emitter device 214 or cloud; a wi-fi (or similar technology) network chip 42, shown here as 808 (also part of the control subsystem 234, a part that may be called a tracking device I/O subsystem); and similar devices common to computers 10, or circuit boards 806, or sensors like those previously discussed in relation to the present invention, but not illustrated in 750, but necessary to implement an embodiment of the present invention and tracking system 200.

The circuit board 806 has a hole 810 used to feed one or more electrical wires, for power and control and possibly other uses (such as wi-fi antenna connections), connecting the circuit board 806 with the servo motors and batteries (not numbered until diagram 800). Notice that the axel assembly also has a hole 816 for housing wires that connect between electrical devices contained within subassembly 750 and 740. The aluminum-mounting component 820 also has two holes 812, and 814 for wires, to accommodate the same electrical connections of components described before. Such accommodations enable the present invention to be both rugged and functional, as will be discussed in greater detail using illustration 800.

Figure 7C:
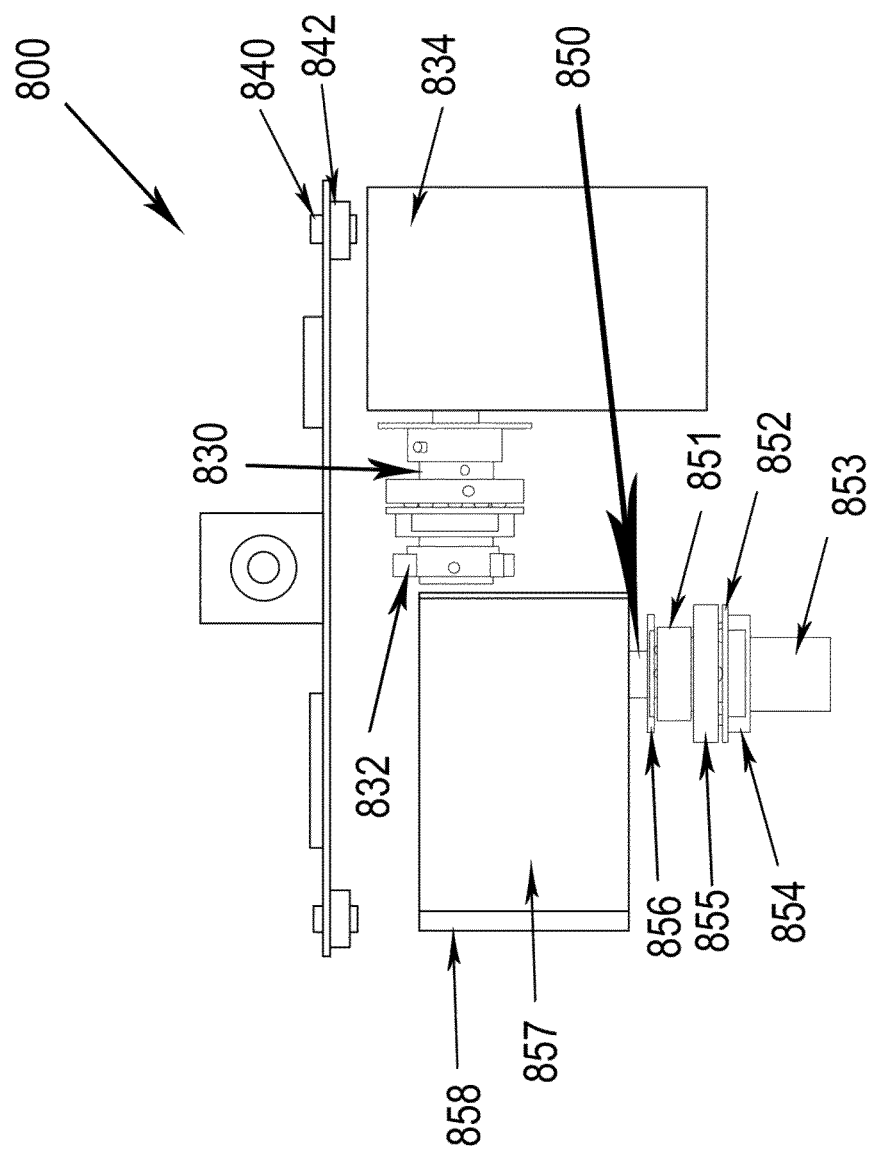
FIG. 7C is another stylized illustration of a subset of components of one embodiment of a tracking device, including those to make it compact, sturdy and water-proof, effective to implement a system in accordance with the invention.

FIG. 7C is another illustration of components 800 of the device shown in 700. The non-aluminum-mounting components (or the non-aluminum-alternative components that are CNC'd to hold the other components) shown in 800 illustrate the unique and novel nature of the design of an embodiment of the present invention, to provide both a quick assembly process, as well as a rugged strength of operation and handling once assembled. Specifically, screws or other attachment devices 840 mount the circuit board 806 to the aluminum-mounting component 820, by providing an o-ring 840 which absorbs shock sustained from the aluminum enclosure (were it to be dropped, or were enclosures 710 and 720 associated with the tracking device 230 to be dropped or otherwise jolted) the enclosing, thus protecting the delicate chips (802, 808) and other components (including camera 804) mounted to the circuit board 806.

Additionally 700 and 800 show bearing and axil systems designed so as to be press-fitted and enable a water-resistance or water-proofing connection to components of the tracking device 230 which are outside of the aluminum (or aluminum-alternative) enclosure system. This provides for ruggedness as well as water proofing.

Servos 858 and another obscured from view directly behind battery 834, are likewise buffered from direct forces to their protruding axils (illustrated by 850 for one servo, and shown but not numbered for the other servo) by use of components such as 856, and 851 that distribute shock from the axils to the enclosure rather than the servo gear systems and motor. Servos 858 and another obscured from view directly behind battery 834, are, when attached to their respective aluminum mounting components, like 820, and then assembled into their enclosures, like 720 and 710, are held in place firmly and thus forces of bumping into other objects (including aluminum mounting components like 820 and aluminum enclosures 720 and 710) is minimized.

Various components are used in a unique combination to make the device more shock-resistant and rugged, including the following: Force on the axils protruding from the servos (like 858) are redistributed to the aluminum mounting components, like 820, and their enclosures, 720 and 710, by means of the other components illustrated in 800.

Components 856 and 851 (not numbered for the second servo), rests against an aluminum mounting component like 820, on the top, nearest the servo, and are attached to servo axel 850, and thus redistribute upward forces on 850 to its aluminum mounting component and from there through to the enclosures 710 and 720 associated with the tracking device 230.

Similarly, components 855, 852, 854 rest upon the aluminum mounting component like 820 on the bottom, and thus distribute downward forces to the aluminum mounting component and from there through to the enclosures 710 and 720, associated with the tracking device 230.

Components may include ball bearing devices such as 854 and 855 so that while being held securely, they can still rotate (tilt or swivel) as required. These ball bearing devices and other components such as 856, may be partly embedded within the aluminum mounting components like 820, and anchored there through screws or other anchoring devices and mechanisms, to add additional strength and immobility to parts that should not move.

These ball bearing devices themselves may themselves be dust-proof and waterproof, and thus combine, with all other precautions, to enable the securing of the overall tracking device 230 from water or dust at its most vulnerable (rotation) points.

The greater, encompassing axel 853 protrudes through the enclosure 740, and anchors to the universal adapter 680, which in turn mounts to "any" tripod or other mounting/suspension device.

Component 830 is unique in that it spans across subcomponent 710 and 740, attaching them together firmly, and providing a means of tilting or rotating in the Y-axis. As can be seen on 830, this and other components thus attached to servo axils and to aluminum mounting component like 820, are also anchored together via screws or other anchoring devices and mechanisms, to add additional strength and immobility to parts that should not move or separate. They may not only be secured by bevels or notches machined out of the aluminum mounting components like 820, but additionally they may be secured to each other via such beveling mechanisms.

As was illustrated in 816, 830 has holes in its center, and side, in order to feed one or more wires used for power, control and perhaps other purposes such as wi-fi antenna connections, between components 740 and 750, enabling communication and control and power to move between sides in a protected manner from outside elements. Finally, component 832 is a ball bearing device that is embedded and anchored (as previously described briefly herein previously) within the aluminum (or aluminum-alternative material) enclosure 720, which houses the subassembly 740, and which thus provides a rigid connection between the two assemblies, as well as a smooth rotation (Y-axis, tilt direction), and water/dust proofing safeguards to the subassembly 720, and thus to the tracking device 230 generally.

The components in 700 additionally combine to hold the servos securely such that even if they are not mounted at centers of gravity and rotation, they will nonetheless distribute resulting forces to the enclosures 740 and 750, and by thus minimize some of the needs to for centering rotational movements, and gain rather the benefits of minimizing the volume of the overall tracking device 230. And because they enable the tracking device 230 swivel and tilting ability, they distribute the forces and momentums of such actions to the rigid enclosure itself, reducing the need for larger, "centered" devices, along with their associated subassemblies. And while the present invention may be scaled for various larger loads of various larger mounted devices 242, the device's relative nature of being compact, portable, rugged is preserved by this compact, if off-centered, device design. Thus, in summary, components shown in 750 and 800 synergistically enhance stability and ruggedness of the tracking device 230, while minimizing its size, and thus add their associated novel and unique benefits to users.

Wherefore, we claim:

1. A method of independent, cinematic control of devices, the method comprising:
   providing a system comprising an emitter, a tracker, a mounted device, and at least one processor operably connected to process data corresponding thereto;
   configuring the emitter to be uniquely identifiable by the at least one processor;
   configuring, by the at least one processor, the tracker to recognize the emitter;
   receiving, from a user, a graphical plot, in two or three dimensions, of a general expected motion path of the emitter, wherein the graphical plot comprises a visual representation of the general expected motion path of the emitter;
   sensing, by an imaging device within the tracker, the emitter;
   determining, by the at least one processor, a physical extent of a subject that is associated with the emitter;
   creating, by the at least one processor, a record based on the sensing and a plotting, by the tracker, of a location of the emitter and the physical extent of the subject;
   configuring and providing to the tracker, by the at least one processor, based on the graphical plot, a relationship defining at least one of a relative motion and a relative position between the subject and the mounted device;
   directing, by the tracker, the mounted device to interact with the subject within the space, based on the sensing and the relationship;
   executing, by the at least one processor at least one of predicting a future position of the subject, smoothing motion of the mounted device by providing smoothing data to the tracker, and positioning the mounted device based on at least one of predicting, smoothing, and tracking;
   receiving, from the user, expected distances, velocities, curves, and vectors associated with the emitter with respect to the tracker; and
   communicating a script, based on user inputs, the script comprising:
      a first condition operating as a triggering condition,
      an action to be conducted by the tracker based on the first condition and a configuration corresponding to configuration settings of at least one of the tracker, the emitter, and the mounted device, and
a second condition, operating as a terminating condition based upon which the tracker ceases the action;
wherein:
the mounted device is selected to include at least one of a camera, a light, and a microphone.

2. The method of claim 1, wherein:
the mounted device is mechanically coupled to the tracker to move in rigid body motion with a coupler constituting a portion of the tracker and movable thereby; and
the at least one processor is programmed to send and receive device data corresponding to at least one of the tracker and the mounted device.

3. The method of claim 2, wherein the device data is selected from control commands to at least one of the tracker and the mounted device, feedback of condition data corresponding to at least one of the tracker and the mounted device, and content generated by at least one of the tracker and the mounted device.

4. The method of claim 1, wherein communicating the script further comprises at least one of:
sending the script to a new user other than a creator thereof; and
receiving by the new user the script from the creator thereof.

5. The method of claim 1, wherein the first condition is selected from:
an existence of more than one emitter visible to the tracker;
the emitter being visible to the tracker;
the emitter being not visible to the tracker;
the tracker detecting more than a single emitter having a same identifier;
the emitter changing a direction of motion while being tracked;
the tracker remaining stationary for a pre-selected period of time;
the emitter remaining stationary for the pre-selected period of time;
the tracker is not tracking the emitter; and
a pre-selected period of time has passed since a datum in time.

6. The method of claim 1, wherein the configuration of the tracker represents at least one of:
a diagram comprising representations of positions of the subjects;
a path comprising a route to be taken by the subject corresponding to the emitter and moving with respect to the tracker;
an activity comprising a set comprising at least one curve defining a motion that is not monotonic, where monotonic represents a single direction not reversed; and
an offset corresponding to at least one of a direction and a distance by which aiming of the mounted device differs from a line between the emitter and the tracker.

7. A computer system for independent, cinematic control of devices, the system comprising:
one or more processors; and
one or more computer-readable media having stored thereon executable instructions that when executed by the one or more processors configure the computer system to perform at least the following:
provide a system comprising an emitter, a tracker, a mounted device, and at least one processor operably connected to process data corresponding thereto;
configure the emitter to be uniquely identifiable by the at least one processor;
configure, by the at least one processor, the tracker to recognize the emitter;
receive, from a user, a graphical plot, in two or three dimensions, of a general expected motion path of the emitter, wherein the graphical plot comprises a visual representation of the general expected motion path of the emitter;
sense, by an imaging device within the tracker, the emitter;
determine, by the at least one processor, a physical extent of a subject that is associated with the emitter;
create, by the at least one processor, a record based on the sensing and a plotting, by the tracker, of a location of the emitter and the physical extent of the subject;
configure and providing to the tracker, by the at least one processor, based on the graphical plot, a relationship defining at least one of a relative motion and a relative position between the subject and the mounted device;
direct, by the tracker, the mounted device to interact with the subject within the space, based on the sensing and the relationship;
execute, by the at least one processor at least one of predicting a future position of the subject, smoothing motion of the mounted device by providing smoothing data to the tracker, and positioning the mounted device based on at least one of predicting, smoothing, and tracking;
receive, from the user, expected distances, velocities, curves, and vectors associated with the emitter with respect to the tracker; and
communicate a script, based on user inputs, the script comprising:
a first condition operating as a triggering condition,
an action to be conducted by the tracker based on the first condition and a configuration corresponding to configuration settings of at least one of the tracker, the emitter, and the mounted device, and
a second condition, operating as a terminating condition based upon which the tracker ceases the action;
wherein:
the mounted device is selected to include at least one of a camera, a light, and a microphone.

* * * * *